A. L. IRVIN & W. E. SIDELL.
COMBINATION UNIT WAY BILL SYSTEM.
APPLICATION FILED MAY 21, 1918.
1,294,912.
Patented Feb. 18, 1919.
3 SHEETS—SHEET 1.
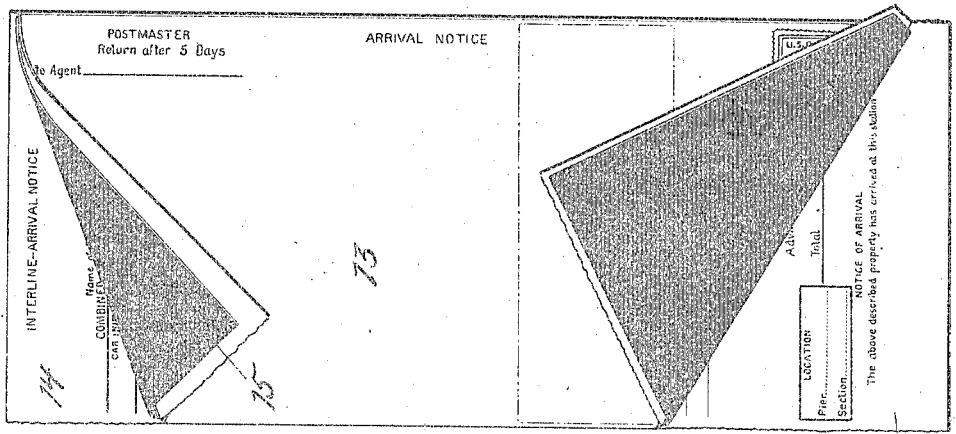
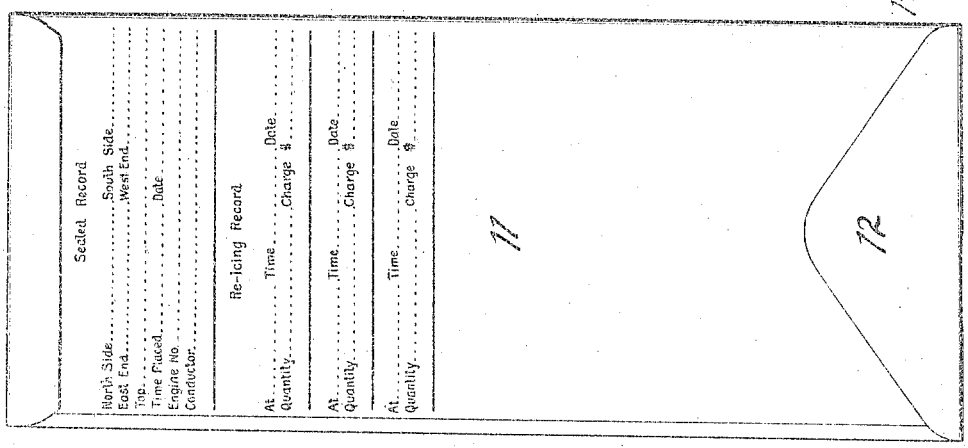
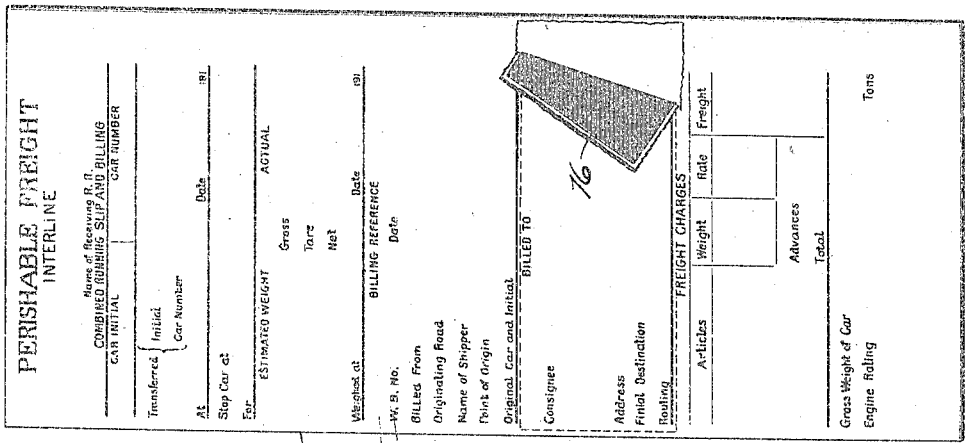

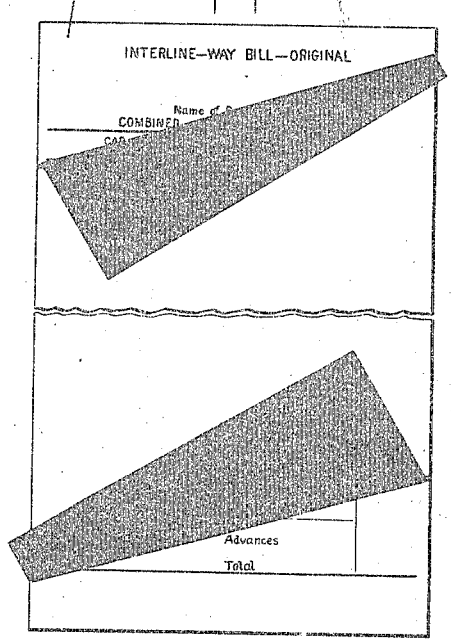
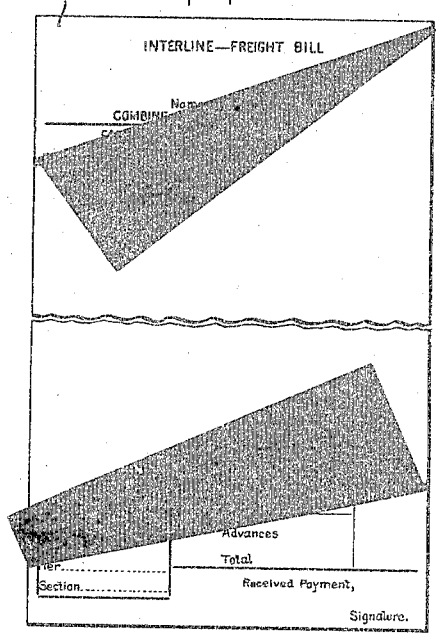
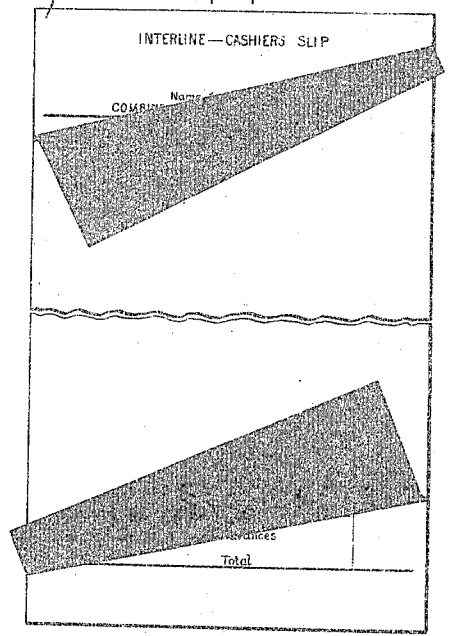
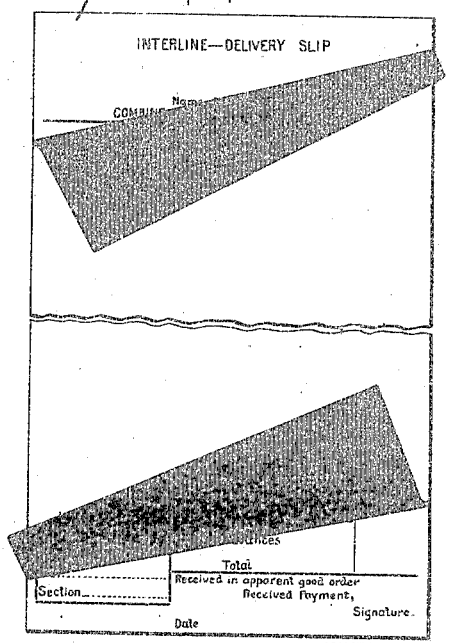

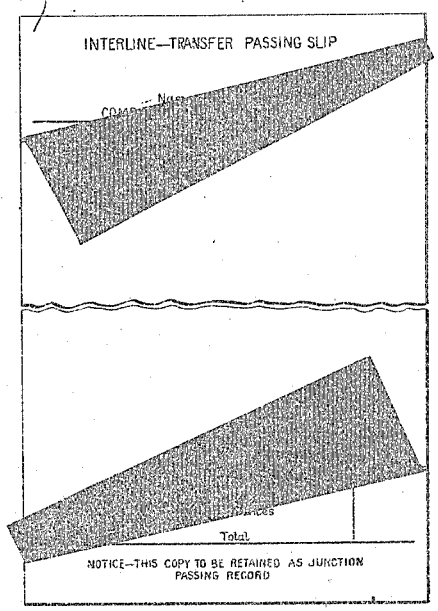
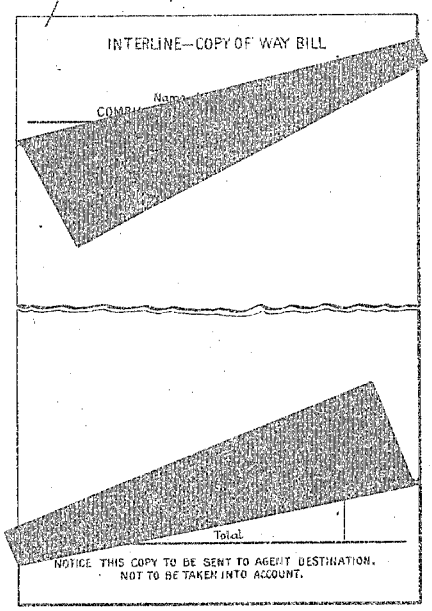
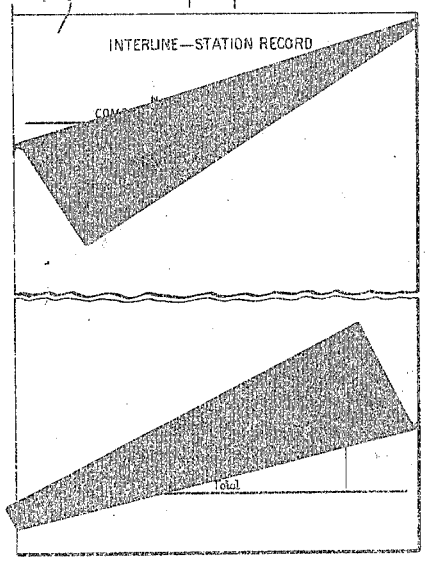
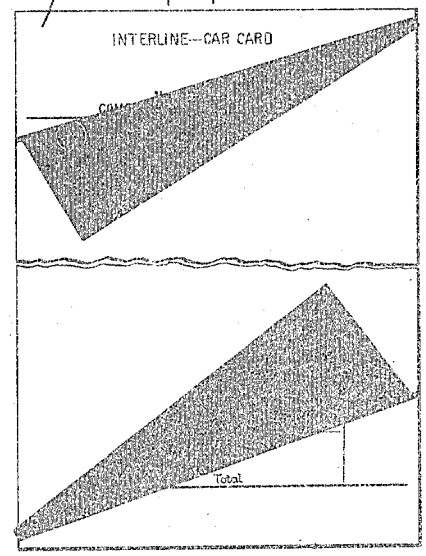
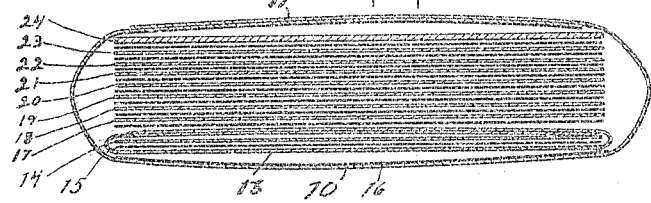

UNITED STATES PATENT OFFICE.

ARCHIBALD L. IRVIN AND WILLIAM E. SIDELL, OF NEW YORK, N. Y.

COMBINATION UNIT WAY-BILL SYSTEM.

1,294,912.

Specification of Letters Patent. Patented Feb. 18, 1919.

Application filed May 21, 1918. Serial No. 235,824.

*To all whom it may concern:*

Be it known that we, ARCHIBALD L. IRVIN and WILLIAM E. SIDELL, both citizens of the United States, and residents of New York, in the county of New York and State of New York, have invented certain new and useful Improvements in Combination Unit Way-Bill Systems, of which the following is a specification.

Heretofore it has been the custom of the various freight carriers to issue bills of lading to the shipper, retaining a copy in their records from which revenue waybills are issued to the point of destination. These bills are as a rule entered upon a large waybill showing the date, car number, station from, station to, name of shipper, consignee, lading, weight, rate and freight charges. Copies of this bill are taken and the original waybill is sent by mail to the agent at destination. In addition the forwarding agent makes up a conductor's running slip which carries the information contained upon the waybill.

It frequently occurs that the agent forwards the car to one destination and the waybill to another thereby causing needless delays. Upon the arrival of the car and waybill at destination the receiving agent proceeds to make out an arrival notice, freight bill, cashier's slip, and delivery receipt, and in addition to these a record has to be made of the forwarding of the arrival notice, and the addressing of an envelop or card and the making of an office record to prove the forwarding of the notice. This method requires at least four separate and distinct writings, first, the waybill, second, the car card, third, the making up of additional slips, and fourth, the sending out of the notice. All of this ordinarily requires four sets of men and at least four sets of books in four separate and distinct places. In case of loss or damage claim tracing, etc.; all of these records must be looked up or brought together again.

One of the main objects of our invention is to reduce to the lowest possible minimum the cost necessary to the railroads or other freight carriers, so far as the billing of freight is concerned. In carrying out our invention we provide a novel construction and arrangement whereby all of the various forms are made out by the forwarding agent at a single writing, the appropriate forms being carried along with the shipment to destination. All of them are made out in a single container to which certain of them are returned after serving their purpose so that all of the records are maintained at one place, where they may be easily looked up at any time. The making out of all of the forms at one writing reduces to a minimum the possibility of mistakes due to careless copying. Unnecessary labor and expense is avoided and time and material is saved and the records are of such form that they may be conveniently filed and readily accessible.

In the accompanying drawings we have shown one embodiment of our invention but it will be evident that various changes, omissions, and additions may be made within the scope of our invention to take care of different freight conditions. The number and character of forms may be varied in accordance with the different kinds of freight, the necessity for transferring from one line to another, and the particular requirements of the different carriers.

In these drawings:

Figure 1 is a face view of the container upon which the original record is made.

Fig. 2 is a rear view thereof.

Fig. 3 is a face view of the combined envelop and arrival notice, portions of the envelop being folded back.

Fig. 4 is a transverse section of the parts shown in Fig. 3.

Figs. 5 to 12 inclusive are face views of various slips which may be carried in the outer container, said slips constituting original waybill, freight bill, cashier's slip, delivery slip, transfer passing slip, copy of waybill, station record and car card, and Fig. 13 is a transverse section through the container and the inclosed slips, said section showing the parts greatly magnified in thickness and spaced apart, it being understood that in practice the sheets are thin and lie close together within the container.

The container shown in Figs. 1 and 2 may be an ordinary envelop having front and back walls 10 and 11 with an ordinary sealing flap 12 along one edge, for instance on one side. The other three edges may be closed in any suitable manner, as for instance, by narrow sealing flaps. The front of the envelop is suitably ruled and provided with suitable legends to indicate the positions of the entries to be made thereon. As shown these include such data as the car initial, car number, contents, shipper, consignee, routing, freight charges, etc. Upon the back of the container may be suitably ruled and designated spaces for data regarding the sealing, icing, etc.; which may be filled in by the conductor or other official while the car is in transit.

Within the outer container or envelop there is placed a second container, envelop, or folder of such a character that it may be sent through the mail, shown in Figs. 3 and 4. The face 13 of this may bear any desired printed matter to indicate the fact that it contains the arrival notice and it may have the necessary postage stamp applied thereto at the time it is placed in the main container and the data filled in on the face of the latter. Within this envelop is the arrival notice 14. This may have substantially the same rulings and legends as the front 10 of the main container except that it preferably also bears the statement to the effect that the property described in the body of the notice has arrived at a particular station and it may also bear a ruled and properly legended section within which may be inserted the pier number, freight station, or other point at which the consignee may find his goods. As above stated the arrival notice 14 is within the inner envelop so as to be mailed in the latter to the consignee. Preferably the arrival notice is printed directly upon the inner surface of the back of the envelop which latter may be left open at both ends. By tearing open the envelop at one side it may be opened out and the arrival notice read.

To duplicate on the arrival notice the data which was filled in on the front of the main envelop or container, there is a layer 15 of reproducing material within the inner envelop and operatively positioned in respect to the arrival notice. So far as the present invention is concerned it is immaterial whether this layer be in the form of a separate carbon sheet or be in the form of a coating on the inner surface of the front wall 13 of the envelop. By means of this inner envelop containing the arrival notice it is unnecessary for the agent at the destination to do other than remove the envelop from the outer container and mail it, as the addressing of the envelop to the consignee is accomplished at the time the consignee's name and address is filled in on the front of the outer container. To secure this result a small sheet of reproducing material is positioned within the outer container beneath the portion of the front wall upon which appears the consignee's name and address. If the arrival notice and its envelop is to be placed in the outer container directly in contact with the front wall of said container then the inner surface of said front wall may have directly applied thereto the layer of reproducing material 16 as shown in Fig. 1. Thus when the data is filled in on the front of the outer envelop all of this data will be reproduced on the arrival notice but only the consignee's name and address will be reproduced on the front of the arrival notice envelop. As a further important advantage of this feature of the construction, it will be noted that the reproducing sheet 15 is in the arrival notice envelop at the time the latter is mailed. Therefore, the postmaster in canceling the postage stamp and applying his data and place stamp will automatically reproduce this place and date stamp on the arrival notice itself within the envelop. This will preclude the possibility of disputes arising as to when the arrival notice was mailed and as to when the demurrage charges begin to accrue.

Within the container are a series of slips and interleaved reproducing layers. All of these may have substantially the same ruling and legends as the front of the container and the arrival notice. In Figs. 5 to 12 inclusive, we have shown various of these slips indicating only the top and bottom of each, the intermediate portion being covered by the sheet of reproducing material disposed above the slip and by means of which the data is entered on the slip. Each slip has its appropriate heading and may also have appropriate places for signatures, stamps, or other data. Among these slips there is preferably an original waybill 17, a freight bill 18, a cashier's slip 19, a delivery slip 20, a transfer passing slip 21, a copy of the waybill 22, a station record 23, and a car card 24. All of these are automatically filled out by the writing, printing or stamping of the data on the front of the container. The container is used as the conductor's running slip and serves as a conveyer for the other slips and at the final destination, serves as a file to which most of the slips are eventually returned. The reproducing sheets remain in the container until it has performed all of its functions. It is immaterial in most respects whether these layers of reproducing material be in the form of separate inter-leaved sheets or whether each be formed on the back of the slip above. If the arrival notice envelop be placed at the front in the container, then it is preferable that a separate carbon sheet be used beneath this envelop to secure the reproduction of the data on the first slip therebeneath to avoid the coating of the back of the arrival notice envelop with the reproducing material.

The original waybill follows the car to destination. When the container arrives at destination there is usually given what is known as a "pro-number", a progressive number. This can be applied to the container and the various slips therein by the use of an automatic numbering machine, a typewriter, or pencil and such number will appear on all of the forms, the waybill included. The receiving agent makes all of his entries from the original waybill. Upon the surrender of the arrival notice or bill of lading and upon payment of the freight charges, the consignee is given a receipt for his money, such receipt being the freight bill 18 which has at the bottom a proper space for the signature of the agent. This slip is ordinarily presented by the consignee to the agent before he can receive his freight.

The slip 19 is placed on file by the cashier and written up later in a memo. cash book. At the time he receives the cash it is not necessary for him to make any entries or otherwise delay the rapid handling of the transaction.

Upon payment of the freight charges the consignee presents his paid freight bill to the proper clerk and receives his freight, the section and location being noted on the freight bill. The consignee upon receiving the freight signs the delivery slip which is retained by the agent delivering the freight and eventually finds its way back into the original container along with any reports of loss or damage and any tracers or correspondence relative to this particular shipment.

If the car is to be transferred from one railroad to another at some transfer point, it may often be desirable that the agent at the transfer point keep a record not only of the car but of the contents thereof and other data. It is merely necessary for him to extract from the container the transfer passing slip 21 and retain it as his record of the fact that such a car was transferred. He can enter on it the time or other data desired. If the car is to pass through several junction points, there may be a corresponding number of these transfer passing slips 21.

In case it is desired or necessary for the carriers to accompany the waybills with the car, owing to the diverting of shipments *en route* to destination via the shortest route, confusion and trouble often arise owing to the difficulty in being able to trace shipments. A copy of the waybill 22 may be carried in the container and serve only to meet such emergencies. This is not to be used as a regular waybill but simply as an advance notice to the receiving agent in order that he may keep in touch with the car *en route* and be in a position to give the consignee some advice when requested to do so. When a change in the routing is made this copy of the waybill may be extracted, the necessary information written thereon, and forwarded to the receiving agent.

In addition to the other slips above referred to, there is preferably a station record 23 which is retained by the forwarding agent as a permanent record. In order to expedite the work and reduce clerical expense, it is the intention that this slip shall be filed with the shipping order. There is also a car card 24 which is also filled out at the same time and which is intended to be tacked upon the side of the car and remain thereon until the car arrives at destination and the goods unloaded and delivered.

The conductor carries the outer container as his running slip and delivers it and its contents over to each succeeding conductor who may take charge of the car or the train. Various slips are extracted therefrom as occasion demands and although these slips may, if desired, be kept on file in the various offices, yet most of them preferably are returned to some one office and replaced and stored in the container. The different slips bearing the different signatures or notations will make up a complete record of the transaction from beginning to end and the container may also receive such correspondence, inquiries, claims for damages or loss, and other documents relating to the shipment. Thus the entire record is available at one point and may be very easily and conveniently investigated at any time.

As has been previously indicated certain of the slips above referred to may be omitted if working conditions do not demand them or certain additional slips may be provided. The slips may be printed in different type or on different color paper or otherwise bear designating marks whereby they may be classified in accordance with the character of the freight or other information. For instance, all of the containers and slips used for perishable freight may be of one color, that for other kinds of other colors. Obviously somewhat different rulings and legends will be required when the carload is made up of different kinds of shipments than what will serve when the car has a carload shipment from one shipper to one consignee. If used for local freight, obviously no passing transfer slip need be employed and if only one routing is possible the slip 22 constituting a copy of the waybill need not be included. The various slips may be made of comparatively thin paper although preferably the slip 24 constituting the car card is of somewhat thicker material so as to be less readily torn or injured while tacked on the car. This may be of comparatively stiff material and placed on the back of the series of slips so as to form a support and facilitate the making of proper impressions on all of the slips.

Having thus described our invention what we claim as new and desire to secure by Letters Patent is:

1. In combination, a container having one face thereof constituting a conductor's running slip and suitably ruled and provided with suitable legends to indicate the position of entries regarding a freight shipment, including a space for the name and address of the consignee, an envelop within the container of a character adapted to be sent through the mail, an arrival notice within said envelop and having rulings and legends corresponding to those of the face of said container, reproducing material within said envelop and reproducing material within said container opposite the record space for the consignee's name and address, whereby the arrival notice may be filled in, and the envelop addressed by the filling in of the conductor's running slip.

2. In combination, an outer envelop, a second envelop separate therefrom and disposed therein, a slip within said second envelop, said slip and the face of the outer envelop having similar legends and similar record spaces for receiving data including a name and address, a reproducing material within said envelop and covering substantially all of the record spaces of said slip, and reproducing material within said outer envelop and in front of substantially only the portion of the inner envelope covering the name and address space of said slip.

3. In combination, an outer envelop, a series of slips therein, and inter-leaved with reproducing material, said slips and the face of the envelop being similarly ruled and having similar legends indicating record spaces for receiving data regarding a freight shipment and including character, weight, shipping point, destination, shipper, consignee, etc., of the freight, the envelop serving as a conductor's running slip and serving to carry said slips during the shipment and to finally receive and store certain of said slips after the completion of the transaction, the data being filled in on all of said slips by means of said reproducing material during the filling in of the face of the envelop, and said slips serving as arrival notice, freight bill, waybill, delivery slip, etc.

4. In combination, an outer envelop or container, an inner envelop disposed therein and separate therefrom and of a character adapted to be sent through the mail, a slip within said inner envelop and constituting an arrival notice, slips constituting a freight bill, a way bill, and a delivery slip within said outer envelop, all of said slips and the face of said outer envelop being similarly ruled and having similar legends and record receiving spaces, and reproducing material in front of each of said slips.

5. In combination, an outer envelop or container, an inner envelop disposed therein and separate therefrom and of a character adapted to be sent through the mail, a slip within said inner envelop and constituting an arrival notice, slips constituting a freight bill, a waybill, and a delivery slip within said outer envelop, all of said slips and the face of said outer envelop being similarly ruled and having similar legends and record receiving spaces, reproducing material in front of each of said slips, and covering substantially all of the record spaces thereof, and a separate reproducing material in front of that portion of the inner envelop registering with a name and address space of said slips.

6. In combination, an outer envelop having its front surface serving as a conductor's running slip, a series of slips disposed therein, the separate slips adapted to serve as a freight bill, a waybill, a car card, a cashier's slip, and a delivery slip, reproducing material within said envelop in front of each of said slips, certain of the record receiving spaces of each slip registering, whereby the entry of data upon the face of the envelop effects entry of the same data in the corresponding spaces of the several slips, said envelop serving to carry said slips during the shipment of the freight, and serving as a permanent storage or filing container for certain of said slips upon the completion of the transaction.

ARCHIBALD L. IRVIN
WILLIAM E. SIDELL